April 22, 1969

A. D. KIRKPATRICK 3,439,969

FAR INFRARED LENS

Filed Oct. 13, 1964

| RADIUS | THICKNESS | SEPARATION | MATERIAL |
|---|---|---|---|
| 11   27.701" | $T_1$  .1315" | $T_2$  .2442" | A  IRTRAN-2 |
| 12 −17.027" | $T_3$  .1221" | $T_4$  1.0332" | B  IRTRAN-2 |
| 13 −  2.055" | $T_5$  .1409" | $T_6$  2.7146" | C  GERMANIUM |
| 14 −  2.695" | $T_7$  .0939" |  | D  IRTRAN-2 |
| 15   14.370" |  |  |  |
| 16 −18.864" |  |  |  |
| 17 −  1.252" |  |  |  |
| 18   00 |  |  |  |

INVENTOR
ARTIE D. KIRKPATRICK

United States Patent Office 3,439,969
Patented Apr. 22, 1969

3,439,969
FAR INFRARED LENS
Artie D. Kirkpatrick, Phoenix, Ariz., assignor to Texas Instruments Incorporated, Dallas, Tex., a corporation of Delaware
Filed Oct. 13, 1964, Ser. No. 403,548
Int. Cl. G02b 3/00, 9/34
U.S. Cl. 350—2                              8 Claims This invention relates to infrared optics, and more particularly to an objective lens operable in the region of 8 to 15 microns for focusing a substantial field of view onto a flat image plane. In a more specific aspect, the invention relates to a far infrared objective lens in which none of the surfaces are aspherical.

In infrared use, an objective similar to a photographic objective, forms an image, in infrared light, on a suitable detector. In infrared imagery, the detector is a photocathode of a tube wherein the illuminated areas emit electrons which are accelerated and focused onto a fluorescent screen at the opposite end of the tube, thus forming a visible image. Non-image forming devices may be of the type in which an output signal, usually electrical, gives information of the presnce of a source of infrared within the field of view.

The problem of providing a suitable objective operable in the region beyond near infrared, namely above about 3 microns, has been found to have three main distinguishing characteristics. One characteristic is that materials other than optical glass must be used. A second characteristic is the limitation of image quality. The third characteristic is the limitation imposed by the combination of the performance requirements and the characteristics of the types of energy detectors which must be used for many applications.

The defraction limit of resolving power of an objective depends upon the wavelength of the light being used. The best image quality obtainable from a source with a given aperture is poorer in the infrared than in the visible band. Taking 0.56 micron as typical of the visible region, the resolution at 3 microns is five times as coarse, and at 10 microns is eighteen times as coarse as in the visible. Such characteristics of operation in the far infrared range are an indication of the fact that there is no straightforward transition from the visible or near infrared practices.

The present invention, relating to operations in the far infrared region of 8 to 15 microns, overcomes the difficult requirements encountered. An object of the invention is to provide an objective which focuses a field of view of 14° in the region of 8 to 15 microns upon a flat image plane, with a resolution of at least 0.2 milliradian over the entire image plane.

More particularly, in accordance with the present invetnion, a four-element objective lens is provided which includes, in the order of occurrence along the incident light path: a convex lens and a concavo-convex lens of a material having a refractive index which varies from about 2.2212 to 2.1507 over the range of from 8 to 15 microns; a convex lens of material having a refractive index of about 4.004 to 4.001; and a concavo-planar lens of the same character as the first two.

In a more specific aspect, an objective lens system having the above four lenses has the following characteristics which may be scaled to any focal length from a 3-inch focal length. The radii of the successive surfaces encountered along the light path are 27.701, −17.027, −2.055, −2.695, 14.370, −18.864, −1.252 inches, and infinity, respectively. The axial lens thicknesses are 0.1315, 0.1221, 0.1409, and 0.0939 inch, respectively. The axial surface separations are 0.2442, 1.0332, and 2.7146 inches, respectively.

For a more complete understanding of the present invention and for further objects and advantages thereof, reference may now be had to the following description taken in conjunction with the accompanying drawings in which.

Figures 1, 2:
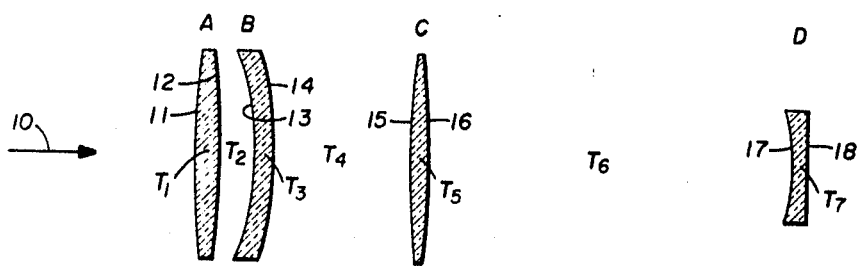
FIGURE 1 illustrates construction of the present invention.
FIGURE 2 is a table descriptive of the properties of the lens of FIGURE 1.

The problem of providing high resolution in a far infrared system for a substantial field of view with minimal chromatic aberration presents a difficult problem. In order to achieve a good design, it is necessary to provide a focus at the same point of all of the wavelengths within the band of interest. At the same time, chromatic aberration must be corrected. Further, in the production of lens systems, it is desirable to utilize surfaces which are spherical. The production of aspherical surfaces is difficult and far more expensive than spherical surfaces.

In materials which are suitable for use in the far infrared region, the refractive index varies considerably over the band so that compensation by use of different materials is necessary. Furthermore, particular geometric relationships for a given system are required for focusing a field of view of 14° in the region of 8 to 15 microns upon a flat image plane with a resolution of at least 0.2 milliradian over the entire plane.

A suitable objective is shown in FIGURE 1. Four elements A, B, C, and D make up the objective. The lens A is a convex lens. Lens B is a concavo-convex lens. Lens C is a convex lens and lens D is a concavo-planar lens.

Lenses A, B, and D are of a material having a refractive index of the order of about 2.2212 to 2.1507 over the range of from 8 to 15 microns. Lens C is of a material having a refractive index of from 4.0043 to 4.0014 over the range of from 8 to 15 microns. The lenses A–C in one embodiment of the invention were 1.5 inches in diameter. The lens D was 0.8 inch in diameter.

In the table of FIGURE 2, the radii of the surfaces encountered along the incident light path 10 are specified for a particular embodiment having a focal length of 3 inches and a speed of f/2. The radius of the incident surface 11 of the lens A is 27.701 inches. The lens surface 12 of lens A had a radius of −17.027 inches. The surface 13 of lens B had a radius of −2.025 inches. The surface 14 had a radius of −2.695 inches. The surface 15 of lens C had a radius of 14.370 inches and the surface 16 had a radius of −18.864 inches. The lens D was a field flattening lens having a surface 17 of radius of 1.252 inches. The surface 18 was a flat surface or of infinite radius.

Lens A had a thickness at the axis thereof of 0.1315 inch. Lens B had a thickness of 0.1221 inch. Lens C had a thickness of 0.1409 inch and lens D had a thickness of 0.0939 inch. The separation at the axis between lenses A and B was 0.2442 inch. The separation between lenses B and C was 1.0332 inches. The separation between lens C and lens D was 2.7146 inches. The separations are the distances between the confronting surfaces of the elements A–D.

In this embodiment, the lenses A, B, and D were made from Irtran-2. This is a pressed suitered zinc sulfide available as Irtran-2 from Eastman Kodak Company, Rochester 4, N.Y. The refractive index at 25° C. for this material varies in the manner set forth in the following table.

TABLE I.—REFRACTIVE INDEX OF IRTRAN AT 25° C.

| Wavelength (microns): | Refractive index |
|---|---|
| 1.0140 | 2.2897 |
| 1.5295 | 2.2700 |
| 2.1526 | 2.2616 |
| 2.5 | 2.2590 |
| 3.0 | 2.2559 |
| 3.4188 | 2.2535 |
| 4.0 | 2.2501 |
| 5.0 | 2.2445 |
| 6.0 | 2.2383 |
| 7.0 | 2.2304 |
| 8.0 | 2.2212 |
| 9.0 | 2.2107 |
| 10.0 | 2.1983 |
| 11.0 | 2.1849 |
| 12.0 | 2.1689 |
| 13.0 | 2.1507 |

The lens C was of germanium. At 27° C. germanium has a refractive index which varies in the range of interest as indicated in the following table.

TABLE II.—THE REFRACTIVE INDEX OF GERMANIUM AT 27°C.

| Wavelength | Refractive index | Wavelength | Refractive index |
|---|---|---|---|
| 2.0581 | 4.1016 | 4.866 | 4.0170 |
| 2.1526 | 4.0919 | 6.238 | 4.0091 |
| 2.3126 | 4.0786 | 8.66 | 4.0043 |
| 2.4374 | 4.0708 | 9.72 | 4.0034 |
| 2.577 | 4.0609 | 11.04 | 4.0026 |
| 2.7144 | 4.0552 | 12.20 | 4.0023 |
| 2.998 | 4.0452 | 13.02 | 4.0021 |
| 3.3033 | 4.0369 | 14.21 | 4.0015 |
| 3.4188 | 4.0334 | 15.08 | 4.0014 |
| 4.258 | 4.0216 | 16.00 | 4.0012 |

Every optical system is designed for one particular object point and one particular image point. If made to operate with the same object point, they will inherently have a different image point and the resolution of the system, when imaging the new object point in the image plane, will not be as good as the points from which the system was designed. The present objective operates from an infinite object point and images the infinite point with an effective focal length of 3 inches. This is unusual, in that such imaging, for a field of view as great as 14° in the special region of from 8 to 15 microns with a resolution as above indicated on a flat plane, represents a new and novel result in the infrared art. The radii of each element, the thickness of the elements, and the spacing between the elements are importat. The materials employed with the optical speed of the system are also significant.

The system may be used in any infrared problem where it is necessary to focus energy in the 8 to 15 micron region over a 14° field of view onto a flat image plane. While Irtran-2 is particularly suitable for the present lens system, sapphire has a refractive index which is close to that of Irtran-2. Arsenic-modified-selenium also presents refractive index characteristics close to those set forth in Table I. There is no substitute material suitable for lens construction which has a refractive index comparable to that of germanium. Thus, germanium would be necessary in the present lens system, with Irtran-2 far preferred over any of the other materials mentioned.

The radii set forth in FIGURE 2 should be maintained with high precision. A total error of 0.2 percent preferably should not be exceeded.

The lens thicknesses should be held to a tolerance of a ±0.005 inch. The separations between the lenses may vary somewhat depending upon the criticality thereof. The spacing $T_2$ may vary ±0.005 inch. The spacings $T_4$ and $T_6$ may vary ±0.010 inch. To the extent that variations are made from the radii and the materials herein specified, non-linearity is introduced into the lens system and the resolution then is degraded.

In the preferred embodiment, germanium blends with the Irtran-2 to achromatize the objective. The use of the two materials serves to bring the radiation over the entire band of from 8 to 15 microns to focus at the same point.

It will readily be appreciated that the lens may be modified to different focal lengths by merely scaling the radii, the thicknesses, and the separations by the same relationship as any desired focal length bears to the 3-inch focal length of the lens illustrated in FIGURES 1 and 2. In such case, however, the materials employed for the elements will be maintained within the limits above described.

Thus, the present invention comprises a four-element objective, having a convex lens, a concavo-convex lens, a convex lens and a concavo-planar lens, with the third of the four elemets of a material having a refractive index of the order of 4 and the first, second and fourth lenses of material having a refractive index of the order of 2.2.

What is claimed is:
1. A far infrared objective which comprises:
   (a) a first convex lens,
   (b) a concavo-convex lens,
   (c) a second convex lens, and
   (d) a concavo-planar lens, with said second convex lens having a refractive index which varies between 4.0297 and 3.9774 in the range of 8 to 15 microns, and the remainder of the lenses of material having a refractive index which varies between 2.2234 to 2.1024 in the range of 8 to 15 microns.

2. The combination set forth in claim 1 in which said second lens is of germanium and said remainder of said lenses are of a pressed sintered zinc sulfide.

3. The combination set forth in claim 1 in which the lens surfaces are all spherical with the radii of the first, second, fifth and sixth surfaces being about an order of magntiude greater than the radii of the third, fourth and seventh surfaces, and wherein the eighth surface is of infinite radius.

4. The combination set forth in claim 1 wherein a focal distance of 3 inches is achieved, the successive surfaces encountered along said light path being spherical and of radii of 27.701, −17.027, −2.055, −2.695, 14.370, −18.864, −1.252 inches, and infinity, respectively, with axial thicknesses of:

lens (a), 0.1315 inch,
   lens (b), 0.1221 inch,
   lens (c), 0.1409 inch, and
   lens (d), 0.0939 inch, and with axial surface separations of 0.2442 inch, 1.0332 inches, and 2.7146 inches between lenses (a) and (b), (b) and (c), and (c) and (d), respectively.

5. The combination set forth in claim 4 wherein the focal distance (X) is other than 3 inches and said radii, said thickness and said separations are scaled in accordance with the ratio X/3.

6. The combination set forth in claim 1 wherein a focal distance of 3 inches is achieved, the successive surfaces encountered along said light path being of radii of 27.701, −17.027, −2.055, −2.695, 14.370, −18.864, −1.252 inches, and infinity, respectively, with axial thicknesses of:

lens (a), 0.1315 inch,
   lens (b), 0.1221 inch,
   lens (c), 0.1409 inch, and
   lens (d), 0.0939 inch, and with axial surface separations of 0.2442 inch, 1.0332 inches, and 2.7146 inches between lenses (a) and (b), (b) and (c), and (c) and (d), respectively.

7. A far infrared objective lens which comprises, in the order of occurrence along the incident light path:
  (a) a convex lens of pressed sintered zinc sulfide,
  (b) a convaco-convex lens of pressed sintered zinc sulfide,
  (c) a convex lens of germanium, and
  (d) a concavo-planar lens of a pressed sintered zinc sulfide.

8. A far infrared objective lens which comprises, in the order of occurrence along the incident light path:
  (a) a convex lens of pressed sintered zinc sulfide,
  (b) a concavo-convex lens of a pressed sintered zinc sulfide,
  (c) a convex lens of germanium, and
  (d) a concavo-planar lens of a pressed sintered zinc sulfide,
wherein all surfaces of said lenses are spherical.

References Cited

FOREIGN PATENTS

| 117,978 | 7/1957 | Russia. |
| 156,710 | 4/1962 | Russia. |

OTHER REFERENCES

Lorant, M.: "An Entirely Novel Type High-Speed, High-Resolution Lens System for Infra-Red Photography," in British Journal of Photography, p. 731, Aug. 23, 1963.

VERLIN R. PENDEGRASS, *Primary Examiner.*

U.S. Cl. X.R.

350—220